(12) United States Patent  (10) Patent No.: US 7,775,154 B2
Hutchinson et al.  (45) Date of Patent: Aug. 17, 2010

(54) PIVOT BLOCK ASSEMBLY OF AN ELECTRIC FRYER

(75) Inventors: Charles Milton Hutchinson, Shreveport, LA (US); Joseph Goodwin, Shreveport, LA (US)

(73) Assignee: The Frymaster Corporation, Shreveport, LA (US)

( * ) Notice: Subject to any disclaimer, the term of this patent is extended or adjusted under 35 U.S.C. 154(b) by 622 days.

(21) Appl. No.: 11/522,784

(22) Filed: Sep. 15, 2006

(65) Prior Publication Data

US 2007/0107606 A1 May 17, 2007

Related U.S. Application Data

(60) Provisional application No. 60/717,691, filed on Sep. 16, 2005.

(51) Int. Cl.
*A47J 31/00* (2006.01)
*E04G 3/00* (2006.01)

(52) U.S. Cl. .................. 99/323; 99/450; 248/278.1; 248/160; 248/288.51; 248/918; 403/166

(58) Field of Classification Search ............... 99/323.9, 99/450; 248/278.1, 160, 288.51, 918; 403/166
See application file for complete search history.

(56) References Cited

U.S. PATENT DOCUMENTS 5,683,064 A * 11/1997 Copeland et al. ......... 248/278.1

FOREIGN PATENT DOCUMENTS

GB 905454 9/1962
GB 905454 * 12/1962

OTHER PUBLICATIONS

International Search Report and Written Opinion dated Sep. 24, 2007 based on PCT application No. PCT/US06/36148.

* cited by examiner

*Primary Examiner*—Shawntina Fuqua
(74) *Attorney, Agent, or Firm*—Ohlandt, Greeley, Ruggiero & Perle, L.L.P.

(57) ABSTRACT

A pivot assembly for use in an electric fryer that rotates heating elements out of a frypot, and a pivot housing that prevents the passage of outside contaminants from entering the pivot assembly. The pivot assembly comprises a tube that has mounting position for heating elements, and the elements can be lowered and raised into the frypot. The pivot housing comprises a hood that fits over the pivot assembly and forms a seal around the assembly, preventing the passage of oil therethrough. The tube of the pivot assembly can comprise one or more heating elements, and the heating elements can be lowered or raised independently of one another.

18 Claims, 24 Drawing Sheets

PIVOT BLOCK ASSEMBLY OF AN ELECTRIC FRYER

CROSS REFERENCE TO RELATED APPLICATION

The present application claims priority to U.S. Provisional Application Ser. No. 60/717,691, filed on Sep. 16, 2005.

BACKGROUND OF THE INVENTION

1. Field of the Invention

This invention relates generally to a pivot assembly that rotates elements out of a pot, and a pivot housing which protects the internal mechanisms of the pivot assembly from outside contaminants. In particular, the pivot assembly is used to rotate heating elements out of the pot of an electric fryer, and the pivot housing prevents cooking oils and other contaminants from entering the pivot assembly.

2. Description of the Related Art

Electric heating elements have been used extensively in the fryer industry for years. Current designs have elements with pivot mechanisms affixed above the oil line or elements sealed under the oil level immovably affixed to a sidewall of a frypot. Elements with pivot mechanisms are generally affixed above the oil line for movement of the elements out of the fryer pot or above the oil line in order to permit the user direct access to the pot for cleaning or maintenance. Most other fryer manufacturers have installed fryers having fixed elements extending through the frypot wall below or above the oil line with static seals.

Traditionally, tilting the heating elements out of the cooking area for cleaning creates opportunities for oil to undesirably enter the rear of the frypot cabinet. These areas are hard to clean which can create a large oil buildup which is unsanitary. Moreover, fixed elements that remain in the frypot impede the user's access to some areas of the frypot during maintenance, such as those areas beneath the heating elements. Again, these areas are hard to clean which can create a large oil buildup which is unsanitary.

Accordingly, there is a need for a pivot assembly that rotates the heating elements out of the frypot but which does not permit leakage of cooking oils or other contaminants into the rear of the frypot cabinet.

It is an object of the present invention to provide a pivot block assembly that permits rotation of the heating elements out of the frypot.

It is also an object of the present invention to provide a pivot housing that prevents leakage of a liquid or other contaminant into the rear of the frypot cabinet.

SUMMARY OF THE INVENTION

The pivot assembly of the present invention comprises an actuator or pivot tube that rotates heating elements out of the frypot and a pivot housing that prevents leakage of a liquid through the pivot tube and into the rear of the frypot itself.

The pivot tube comprises a tubular portion that has mounting positions for one or more heating elements along its axis. At opposite ends of the pivot tube are brackets. These brackets are used to rotate the pivot tube through the use of a tension spring connected to the brackets and located on the opposite side of the pivot tube from the mounted heating elements. When the tension on the spring is increased, the pivot tube is rotated accordingly, raising the heating elements up above the oil line and out of the frypot.

The pivot housing comprises a hood that is placed over the pivot tube and which forms a seal with the upper edge of the frypot. The portion of the pivot housing that is placed over the pivot tube also forms a seal, thus preventing any contaminating liquids from entering the internal fryer mechanisms or the rear of the fryer.

In an alternative embodiment of the present invention, the tubular portion of the pivot tube can be separated into two or more components. This allows each heating element to be manipulated individually, and used in separate frypots. This embodiment thus allows for the simultaneous frying of two or more separate foods.

The fryer can further comprise a probe mounted to the heating element that monitors the oil temperature. The probe can remain in the same relative position to the element during operation.

The above-described and other features and advantages of the present disclosure will be appreciated and understood by those skilled in the art from the following detailed description, drawings, and appended claims.

DESCRIPTION OF THE INVENTION

Figure 1:
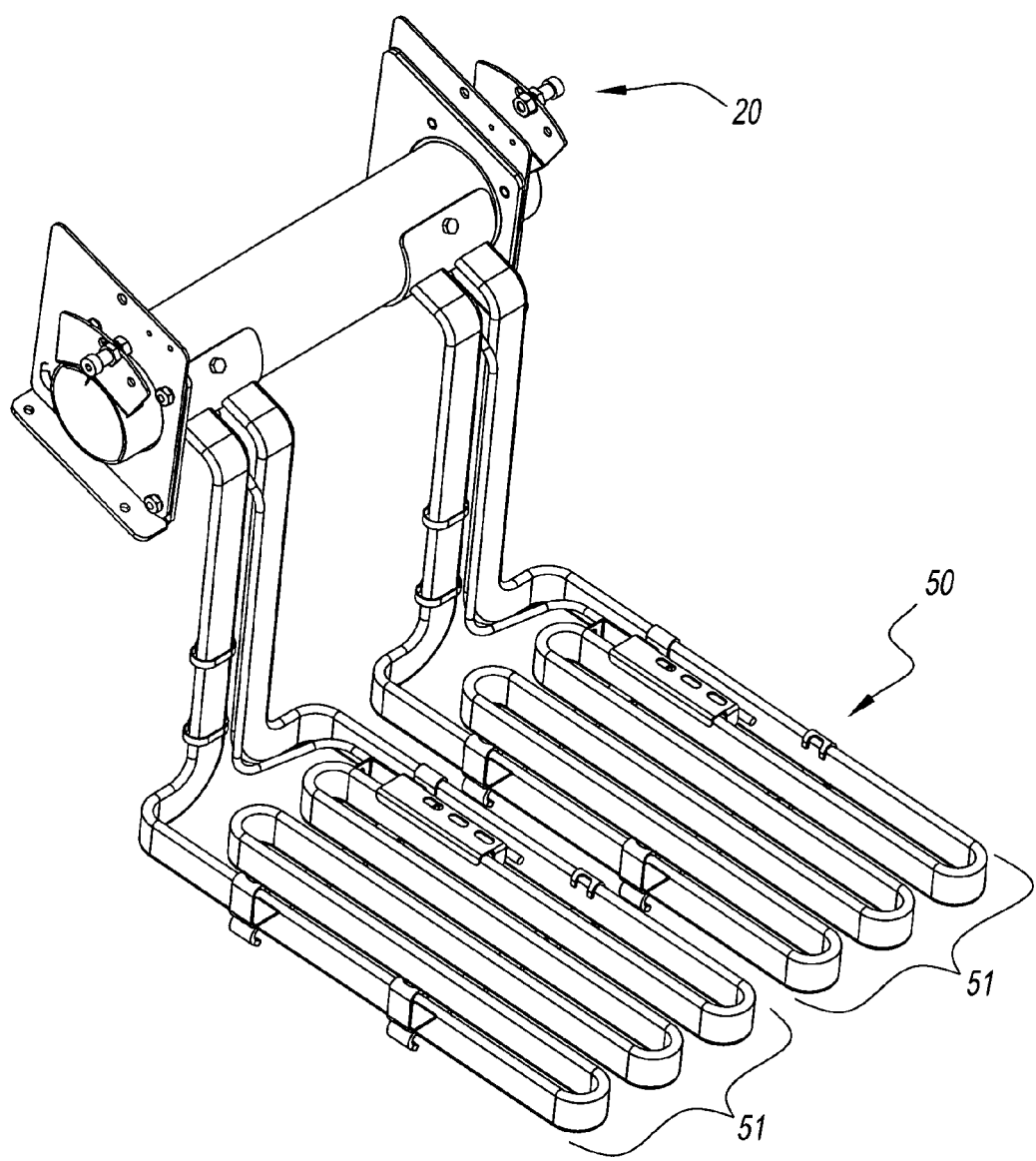
FIG. 1 shows a front, left side perspective view of the pivot and heating element assemblies of the present disclosure.
Figure 2:
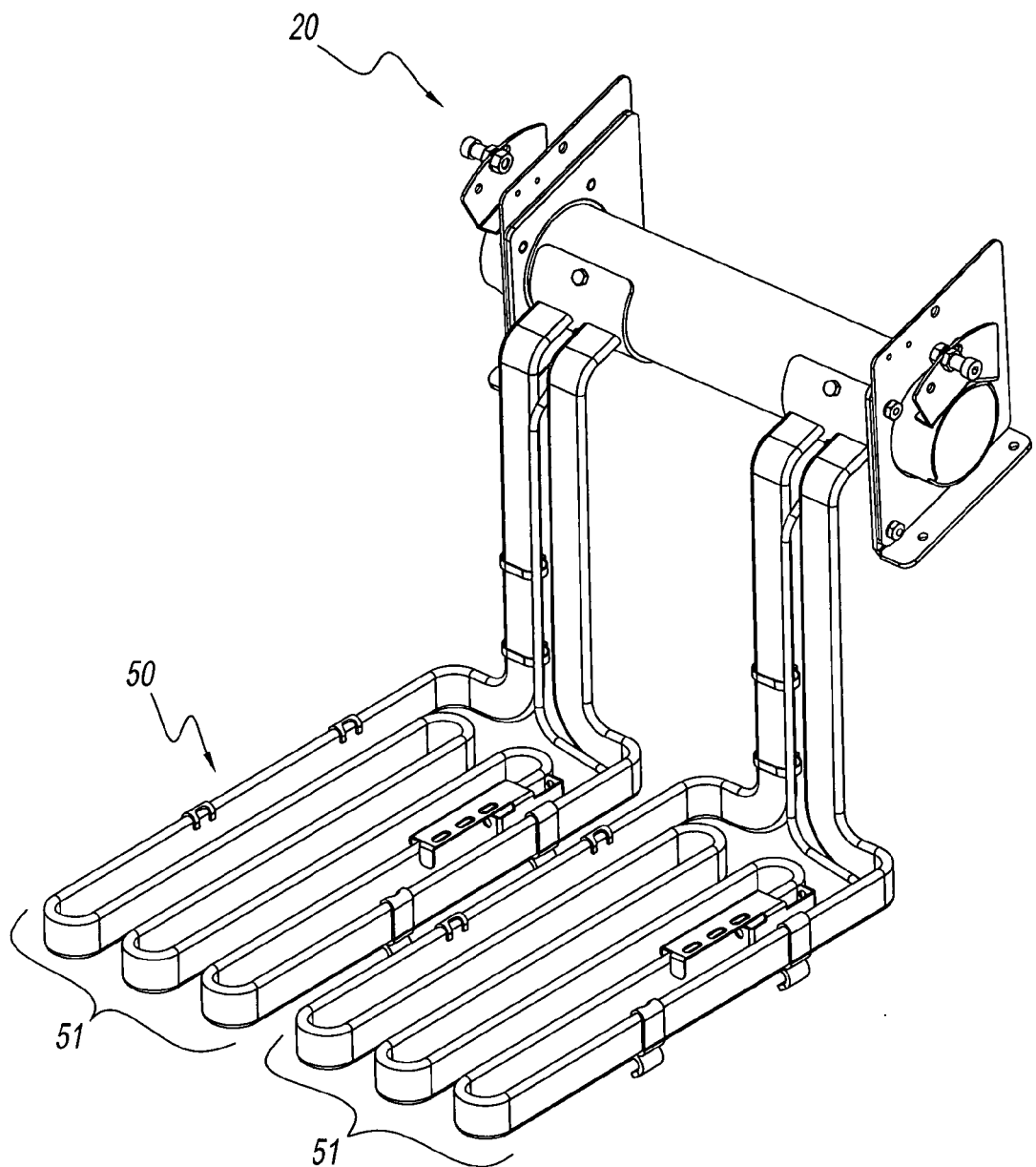
FIG. 2 shows a front, right side perspective view of the pivot and heating element assemblies of FIG. 1.

Referring to FIGS. 1 and 2, the invention of the present disclosure has pivot assembly 20 and heating element assembly 50. Heating element assembly 50 further has a number of heating elements 51. In the shown embodiment, there are two heating elements per heating element assembly, but the present invention contemplates the use of one or more heating elements per assembly. The heating elements consist of one continuous sheath of metal that is formed in the shape of the loops shown in the drawings. The electrical wiring used to heat the loops is located inside this sheath. In the shown embodiment, there are three heating loops per heating element; however, the present invention contemplates the use of one or more heating loops per heating element.

Figure 3:
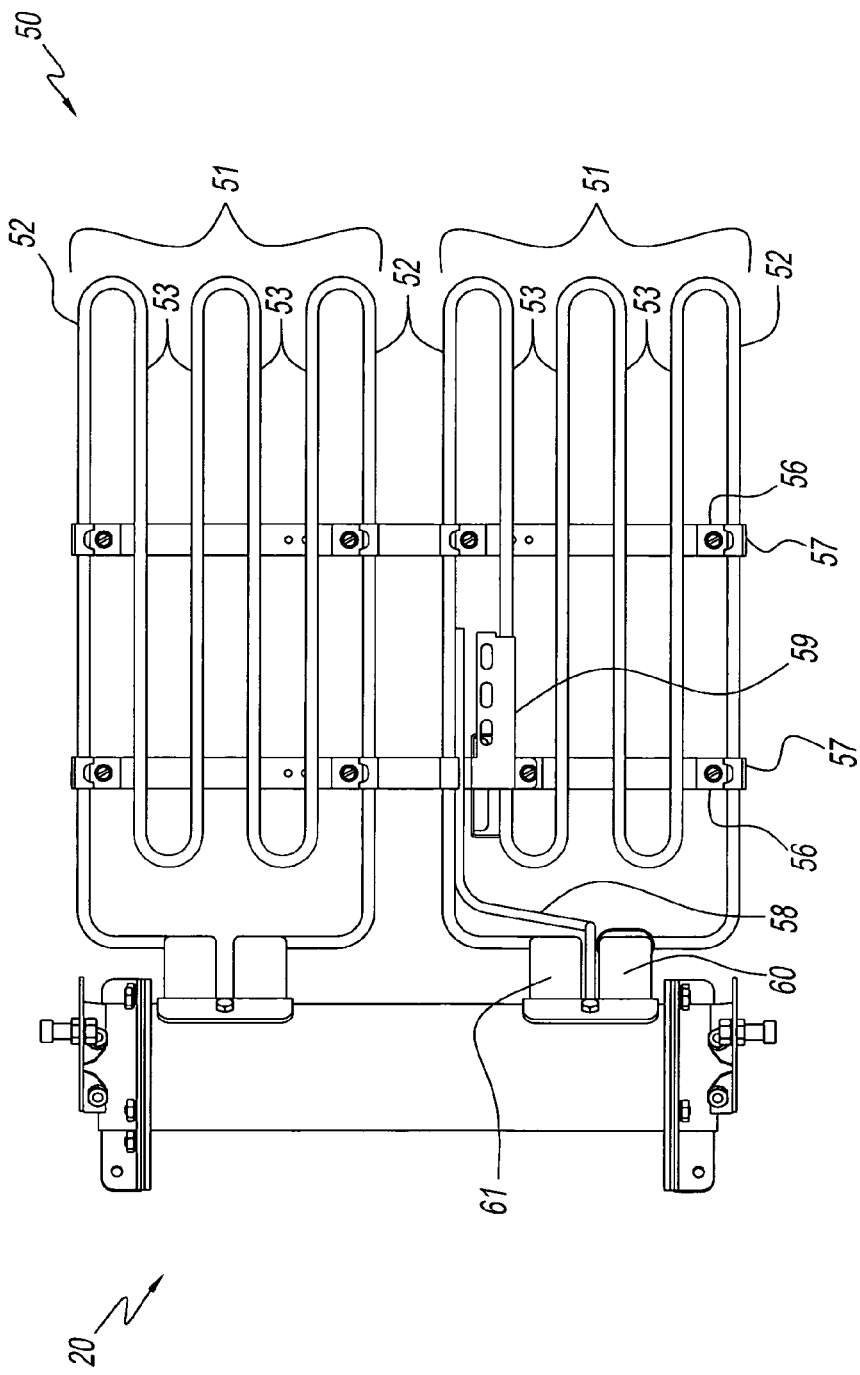
FIGS. 3, 4, and 5 show a top, side, and front view, respectively, of the pivot tube and heating element assemblies of FIG. 1.
Figure 4:
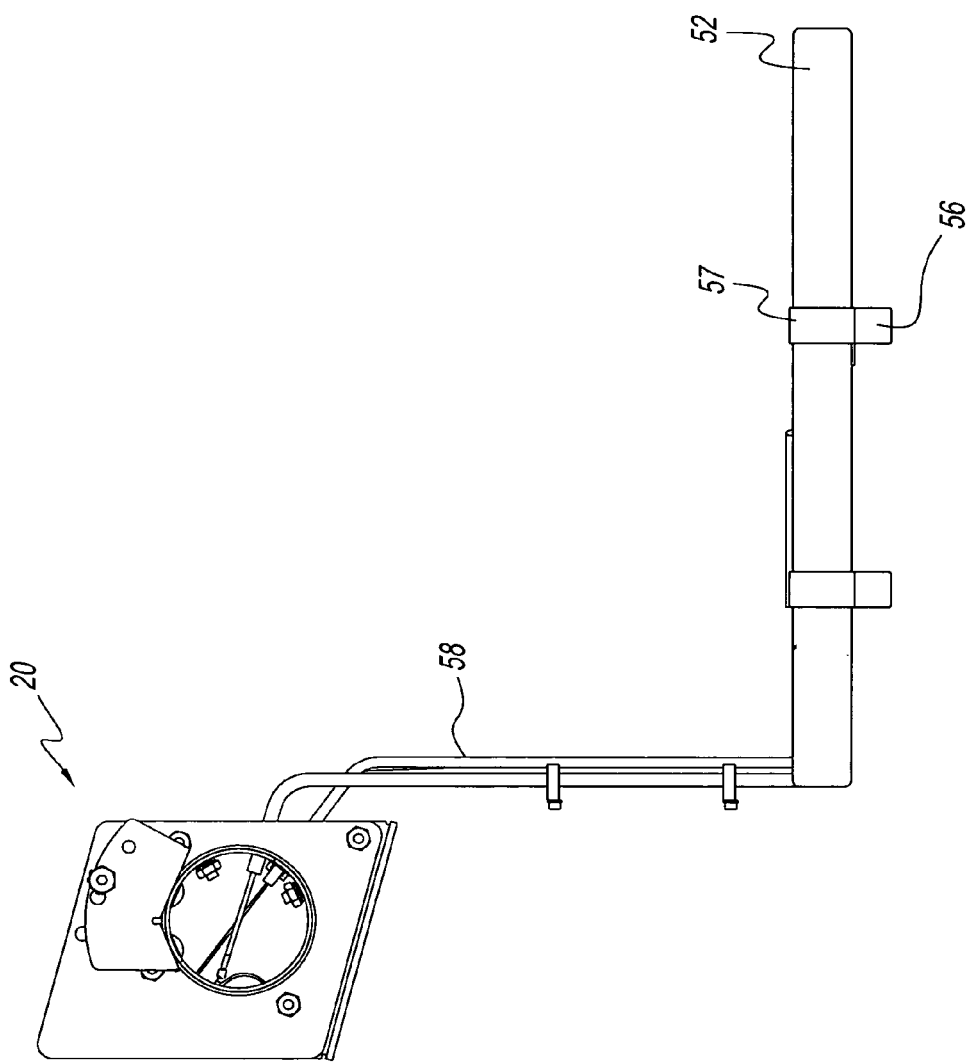

Referring to FIGS. 3 and 4, heating elements 51 have external ribs 52 and internal ribs 53. Bracket 56 runs perpendicular to and underneath all external and internal ribs 52 and 53 of the heating loops 51, and is joined to external ribs 52 with clamps 57. In the shown embodiment, clamp 57 is a snap-on mounting bracket that does not use fasteners; however, other means of attaching bracket 56 to external rib 53 of the heating loop may be used. Additionally, in the shown embodiment there are two brackets 56, using four clamps 57 per bracket. The present invention, however, contemplates the use of one or more brackets 56 per heating element.

Figure 5:
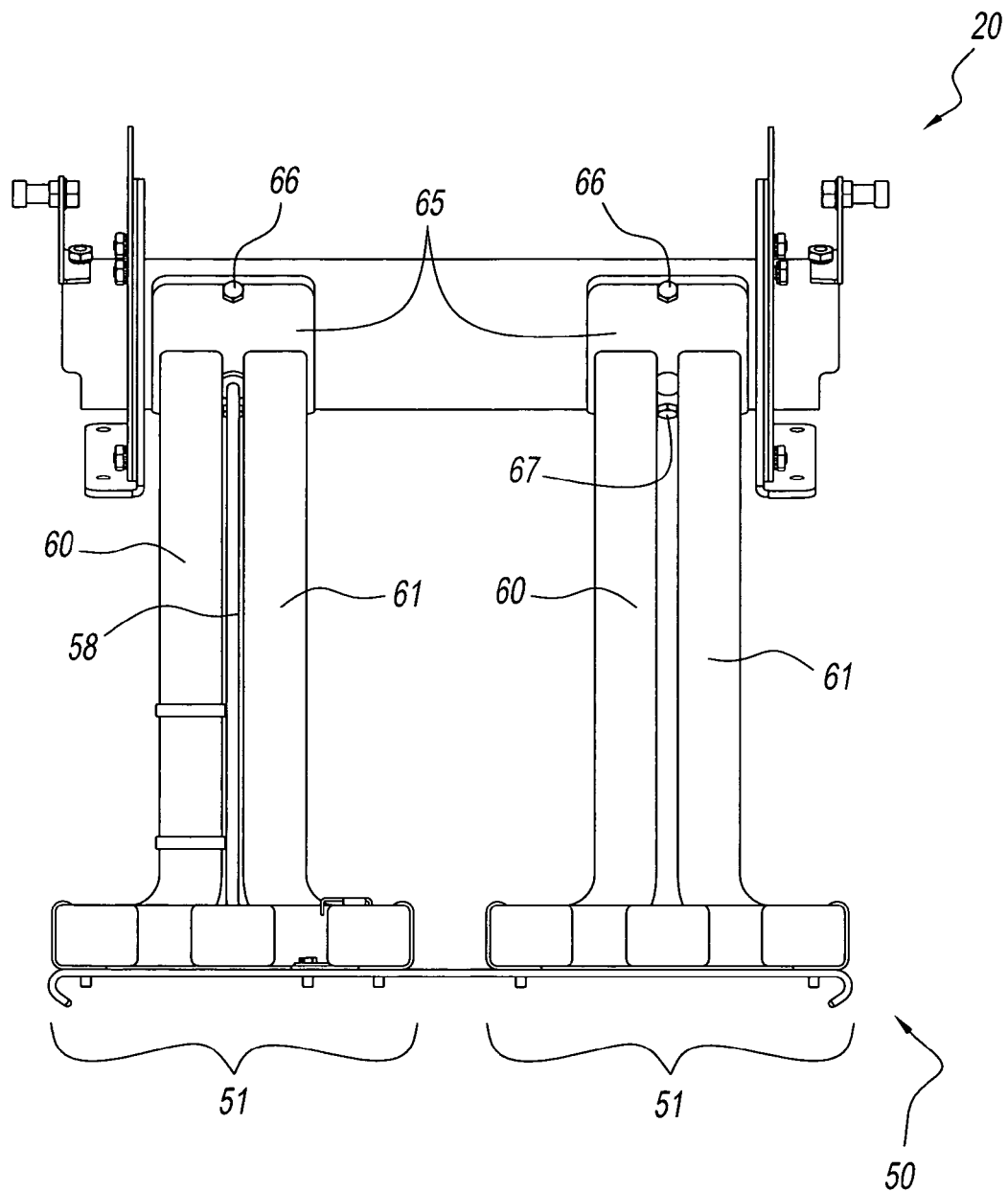

Referring to FIGS. 3, 4, and 5, each heating element 51 has left and right heating element stems 60 and 61 respectively. Temperature probe 58 runs from a junction with pivot assembly 20 parallel to and in between left and right heating element stems 60 and 61, then bends to run parallel to the heating loop ribs, flush with the level of heating element 51. It is joined to an internal rib through the use of probe clamp 59. Probe clamp 59 uses a snap-on means of attachment to join internal rib 52 to temperature probe 58; however, other attachment means are contemplated by the present invention, including, but not limited to screw fasteners and permanent welding.

Referring in particular to FIG. 5, heating element stems 60 and 61 are welded to element bracket 65. Element bracket 65 has upper fastening hole 66 and lower fastening hole 67. In the shown embodiment, screw fasteners are inserted into fastening holes 66 and 67 to attach element bracket 65 to pivot assembly 20. However, other ways of attaching element bracket 65 to pivot assembly 20 are contemplated by the present invention, including but not limited to spring-loaded and tongue and groove fastening methods.

Figure 6:
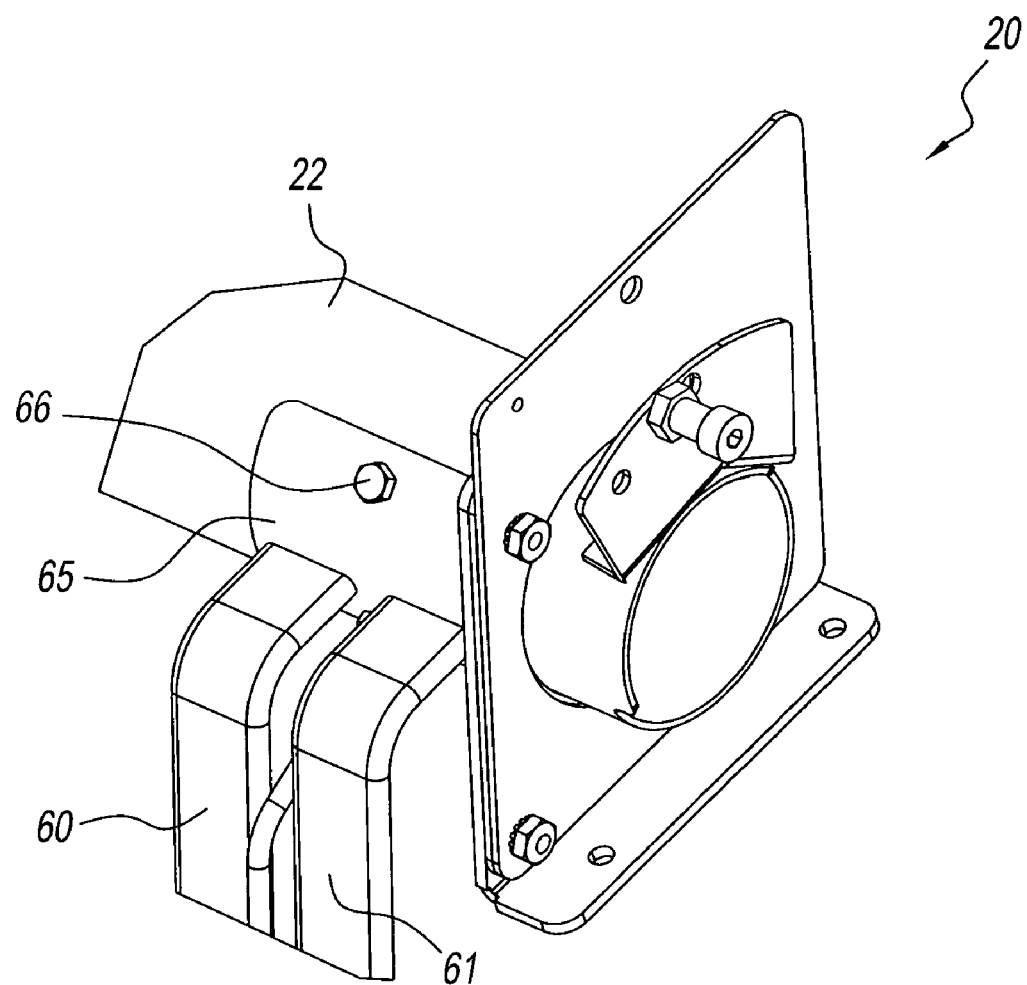
FIG. 6 shows an enlarged front, right side perspective view of the junction between the pivot tube and heating element assemblies of FIG. 1.

FIG. 6 shows an enlarged view of an end of the pivot assembly 20, and how heating element stems 60 and 61 are joined to element bracket 65. Pivot assembly 20 has pivot tube 22. Element bracket 65 is attached to pivot tube 22 through upper and lower fastening holes 66 and 67. Lower fastening hole 67 is on the underside of pivot tube 22 and is not visible in this Figure.

Figure 7:
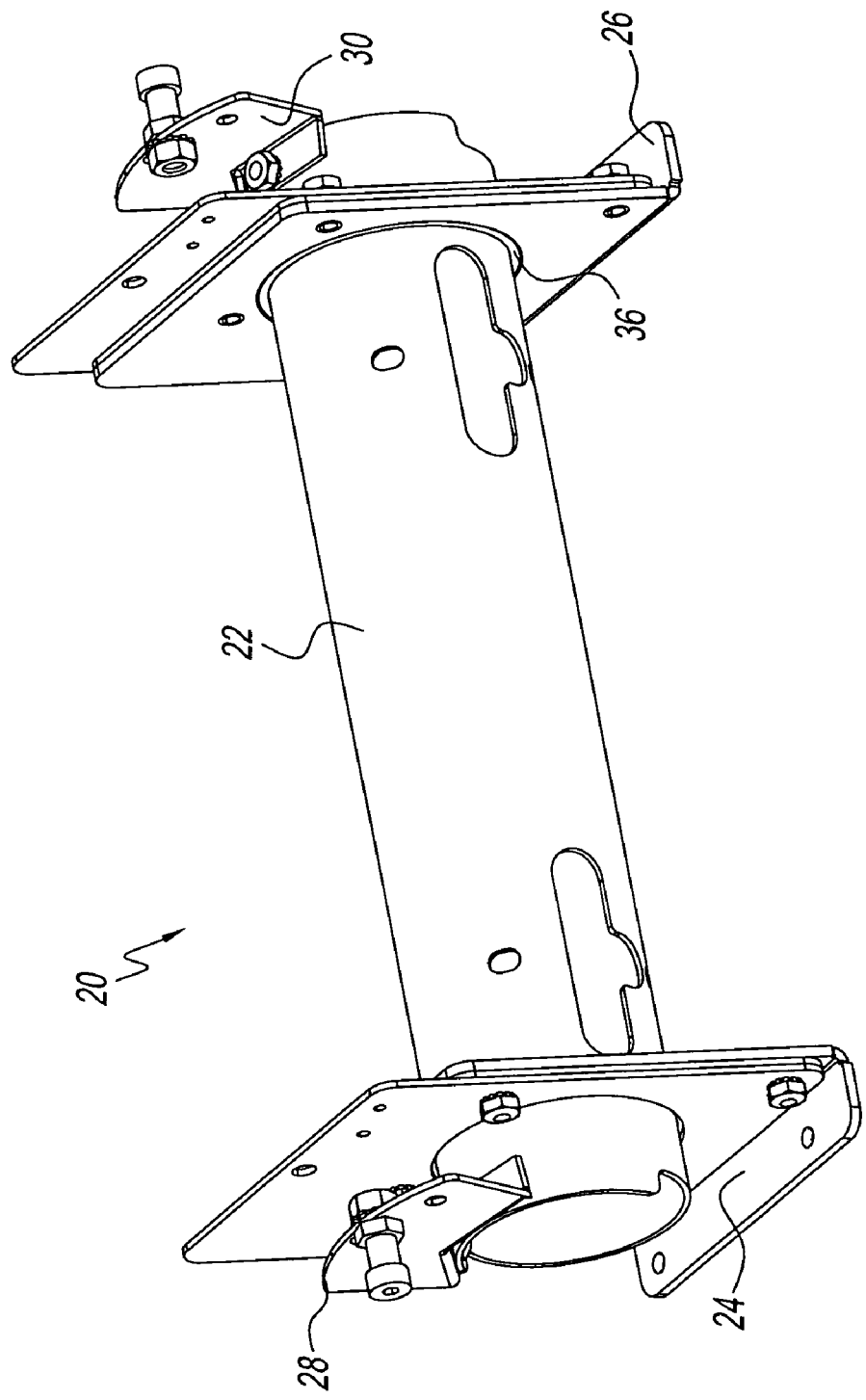
FIG. 7 shows a front, left side perspective view of the pivot tube assembly of the present disclosure.

Referring to FIG. 7, pivot assembly 20 also has left tube support bracket 24, right tube support bracket 26, left upper spring bracket 28, and right upper spring bracket 30. The ends of tube 22 extend through openings in tube support brackets 24 and 26. Tube bushing 36 functions as both a seal and bearing between tube 20 and support brackets 24 and 26. It prevents the passage of fluid between these components, and also allows tube 20 to rotate within support brackets 24 and 26. In the shown embodiment, tube bushing 36 is made of Teflon. However, any heat-resistant polymer with a low friction coefficient can be used and is contemplated by the present invention.

Figure 8:
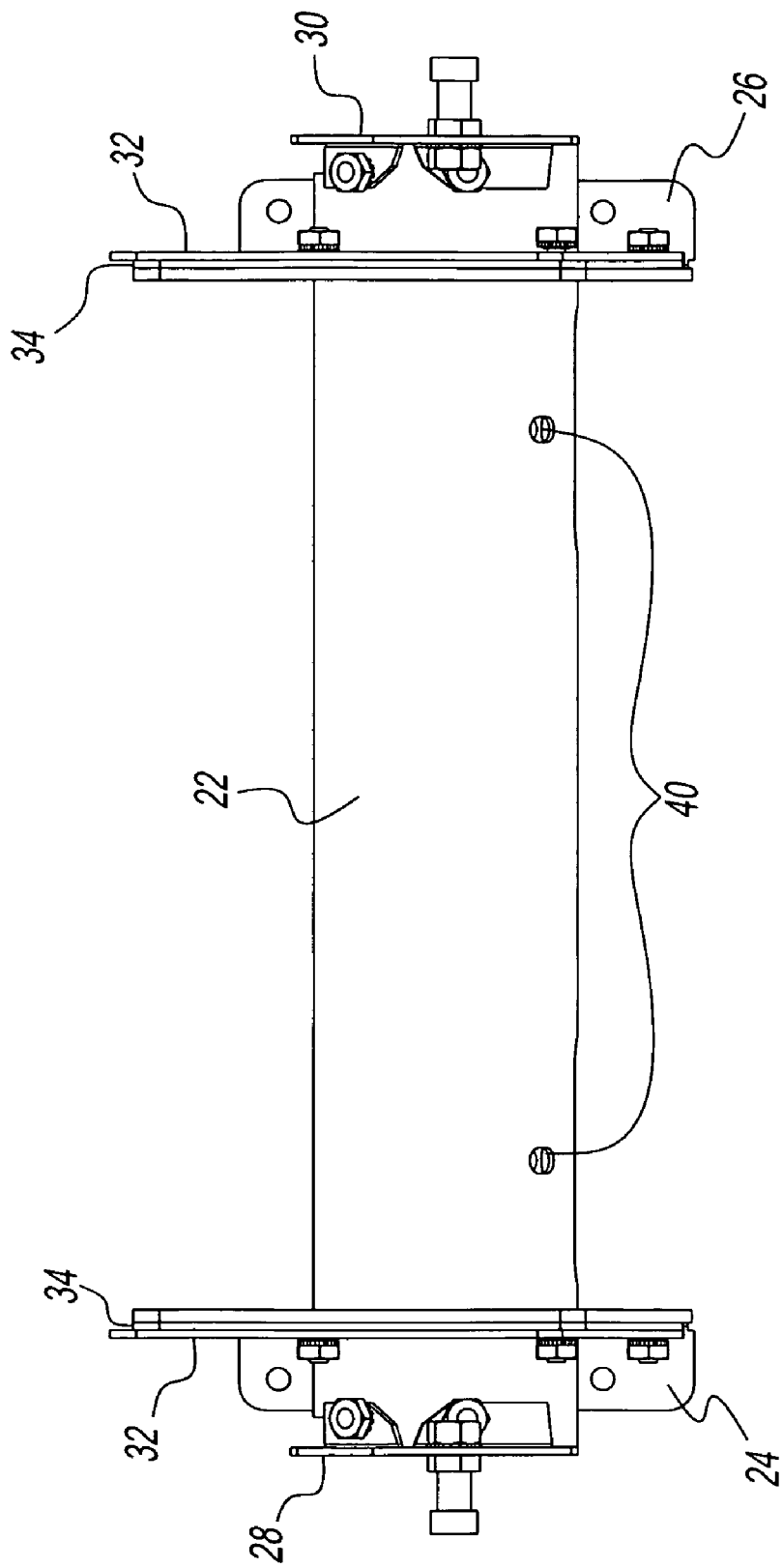
FIGS. 8, 9, and 10 show a top, front, and side view, respectively, of the pivot tube assembly of FIG. 7.
Figure 9:
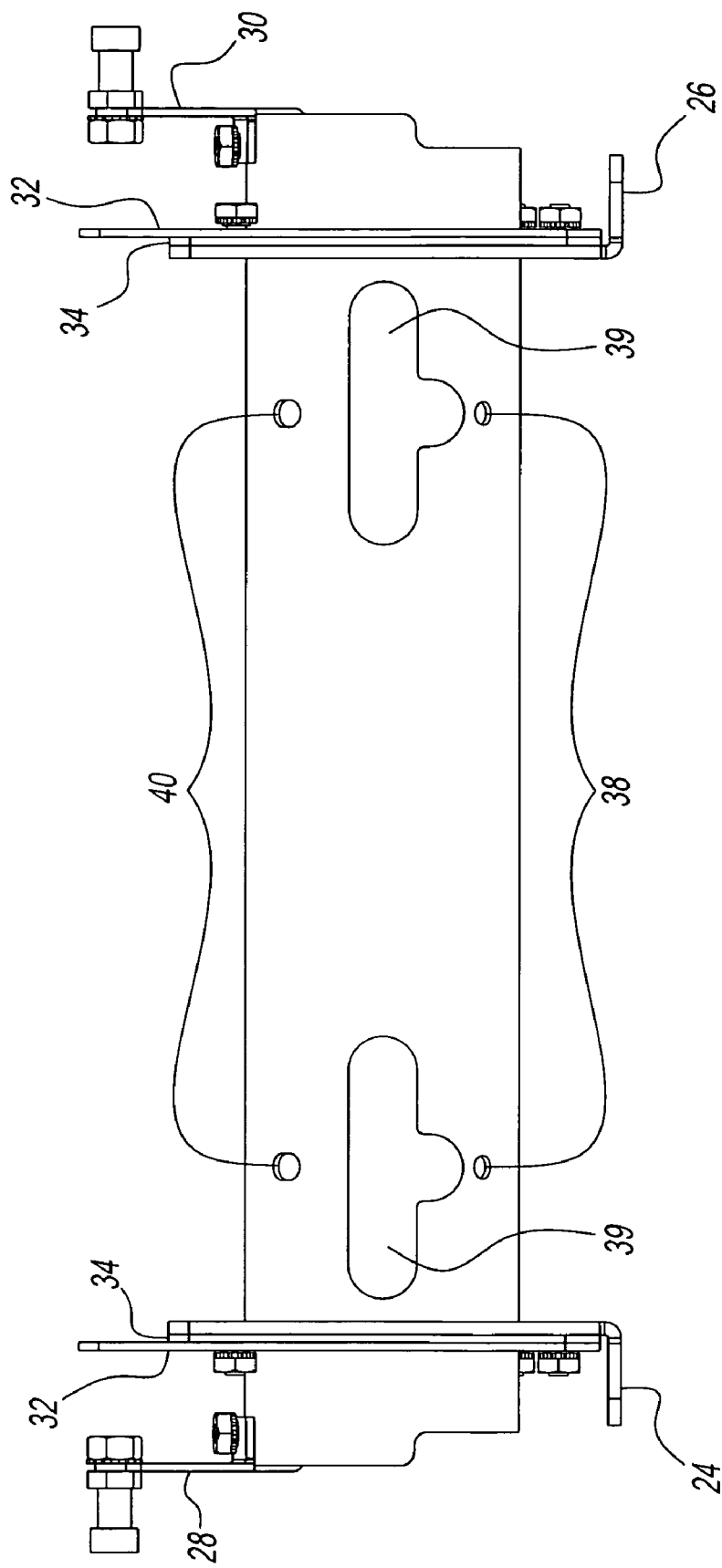
Figure 10:
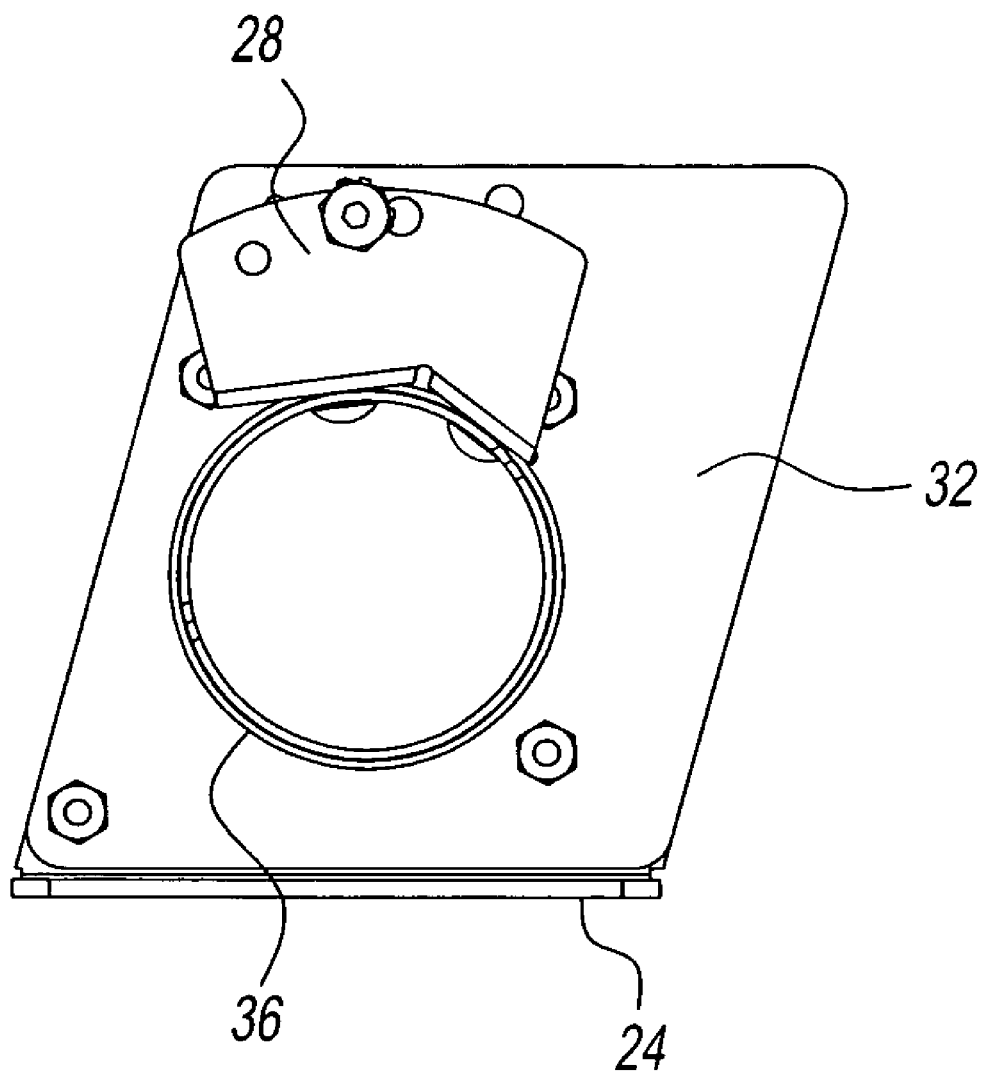

Referring to FIGS. 8, 9, and 10, pivot tube 22 has two upper tube fastening holes 40 and two lower tube fastening holes 38, which correspond to upper fastening hole 66 and lower fastening hole 67 of element bracket 65, shown in FIG. 5. Element bracket 65 is connected to tube 22 through the use of tube fastening holes 40 and 38. Tube 22 also has conduit 39. The electrical wiring to the heating elements and temperature probe is routed through conduit 39, under element bracket 65, so that the wiring is not exposed to the ambient environment.

Pivot assembly 20 has outer support plate 32 and inner support plate 34. The two plates and the tube support brackets—32, 34, and 24 on the left side, and 32, 34, and 26 on the right—are aligned adjacent to one another. In the shown embodiment, the plates are fastened together with a nut and bolt, but other methods of joining the plates together are contemplated by the present invention.

On the outside portion of support brackets 24 and 26, tube 22 is connected to left and right upper spring brackets 28 and 30. In the present embodiment, the upper spring brackets 28 and 30 are attached to tube 22 with a nut and bolt screw fastener. However, other methods of connection are contemplated by the present invention, such as with welding or rivets.

Upper spring brackets 28 and 30 have several holes along the upper ridge. These holes can be used to connect a spring mechanism that rotates the pivot tube, thereby raising and lowering the heating elements in the frypot.

Figure 11:
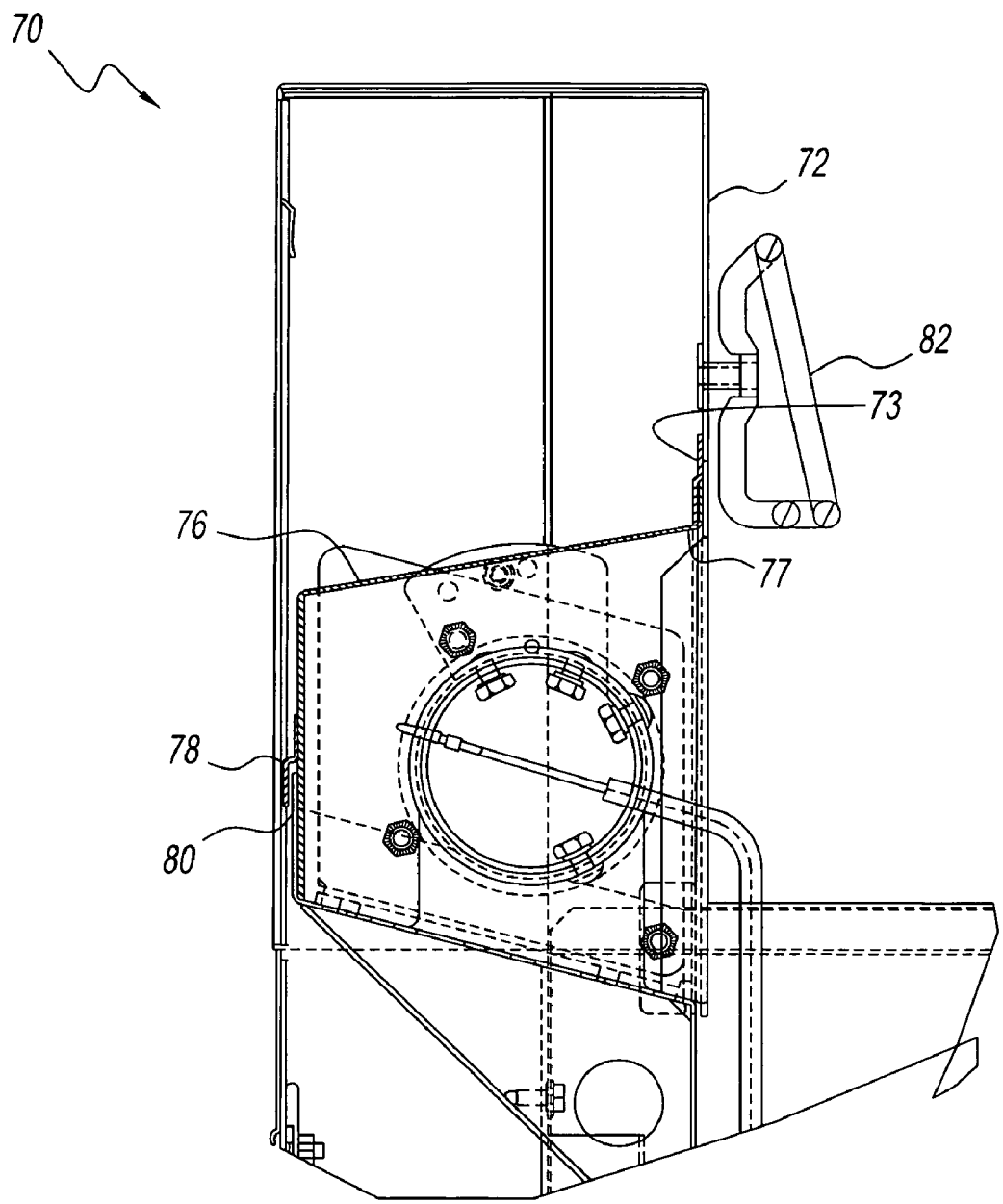
FIG. 11 shows a side view of the pivot housing and pivot assembly.

The present invention also includes a pivot housing 70, shown in FIG. 11. Pivot housing 70 has upper component 72 and lower component 76. Lower component 76 has lower connection notch 78, which forms a tongue and groove seal with frypot upper edge 80. This seal is tight enough to prevent the leakage of cooking oil into the rear of the fryer assembly, in the event that such oil splashes up out of the frypot. The tongue and groove seal between lower connection notch 78 and frypot upper edge 80 in the present embodiment is preferred, to allow for easier removal and cleaning of the pivot housing components. However, other means and methods of connecting the two are contemplated by the present invention, including more permanent means of connection such as with fasteners.

Upper component 72 has upper connection notch 73, which forms a tongue and groove seal with upper sealing edge 77 of lower component 76. This seal also prevents cooking oil from leaking into the back of the fryer. Upper component 72 can also have a basket hanger 82, used to suspend foods to be cooked in the frypot.

Figure 12:
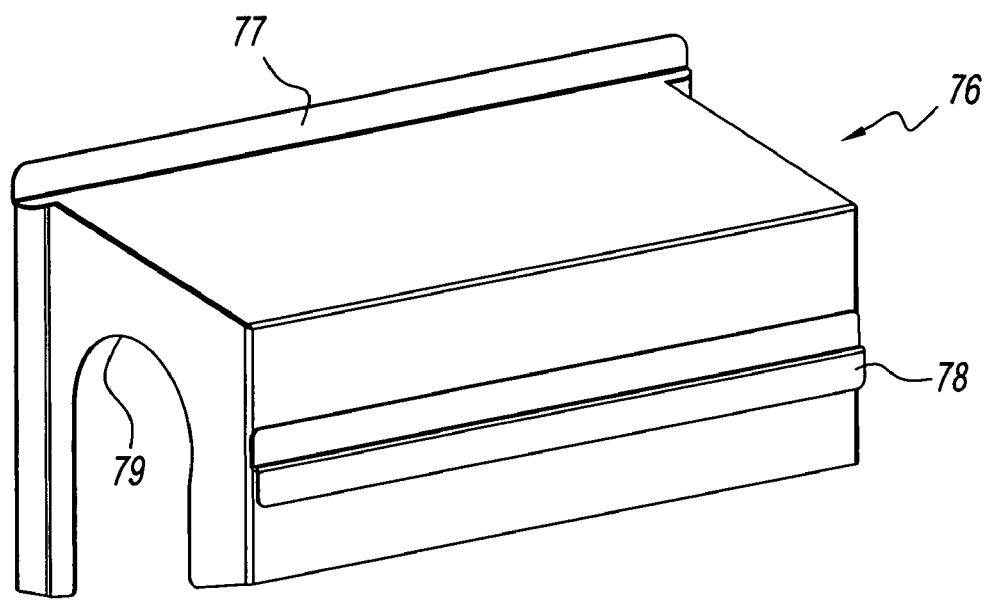
FIG. 12 shows a rear, left side perspective view of the pivot housing.
Figure 13:
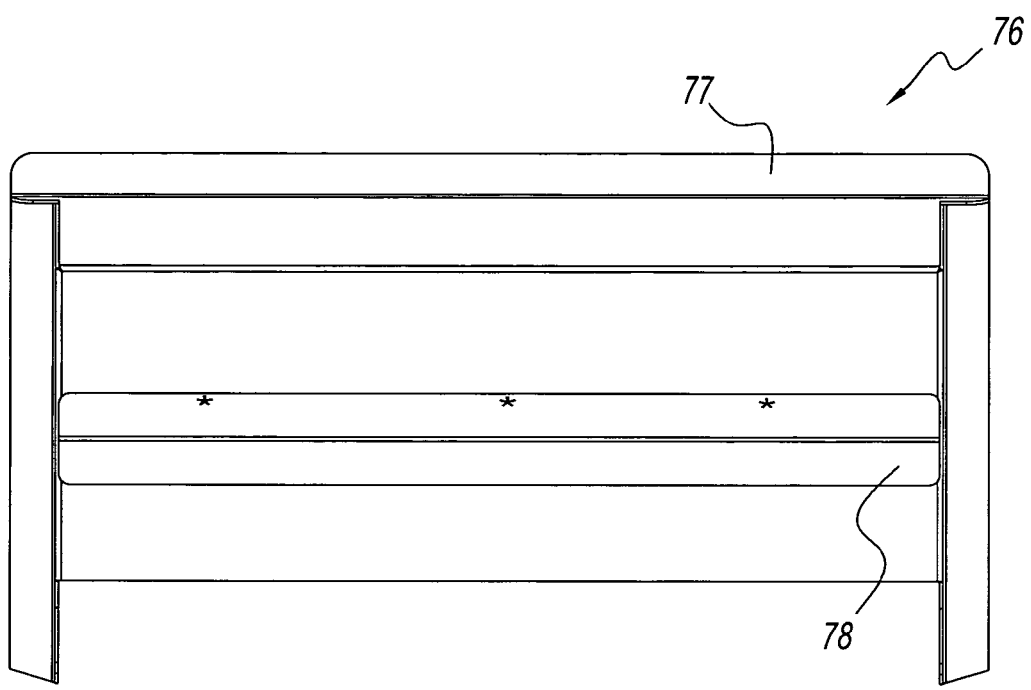
FIGS. 13 and 14 show a rear and side view of the pivot housing.
Figure 14:
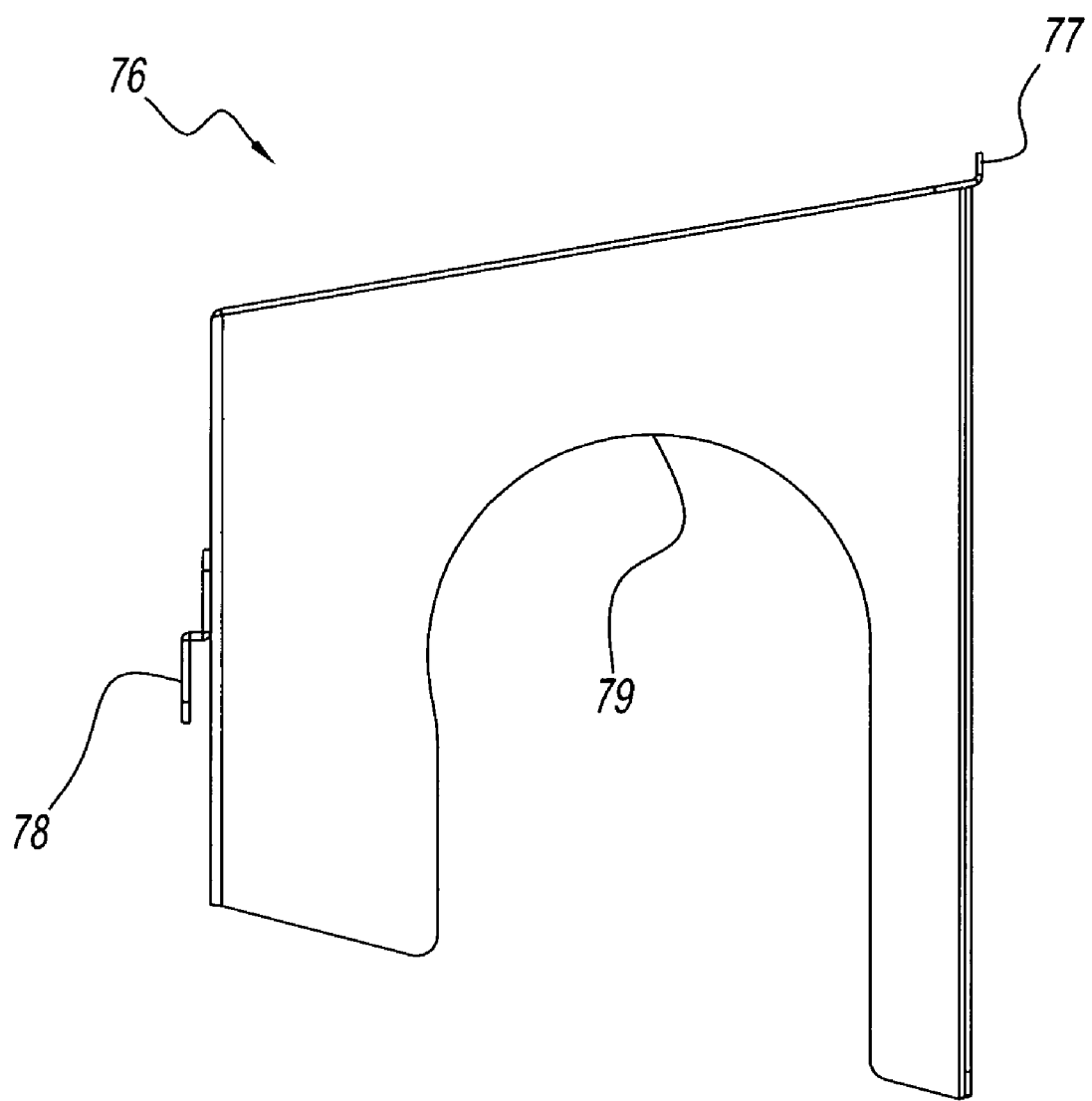

Referring to FIGS. 12, 13, and 14, lower component 76 of pivot housing 70 has inner radius 79. In the completed assembly of the electric fryer, inner radius 79 fits over tube 22 between left tube support bracket 24 and right tube support bracket 26 (shown in FIG. 7), so that the rear of the fryer is sealed off from the area in front of the pivot housing and from the frypot. This seal serves to prevent any cooking oils from leaking into the rear of the fryer.

Figure 15:
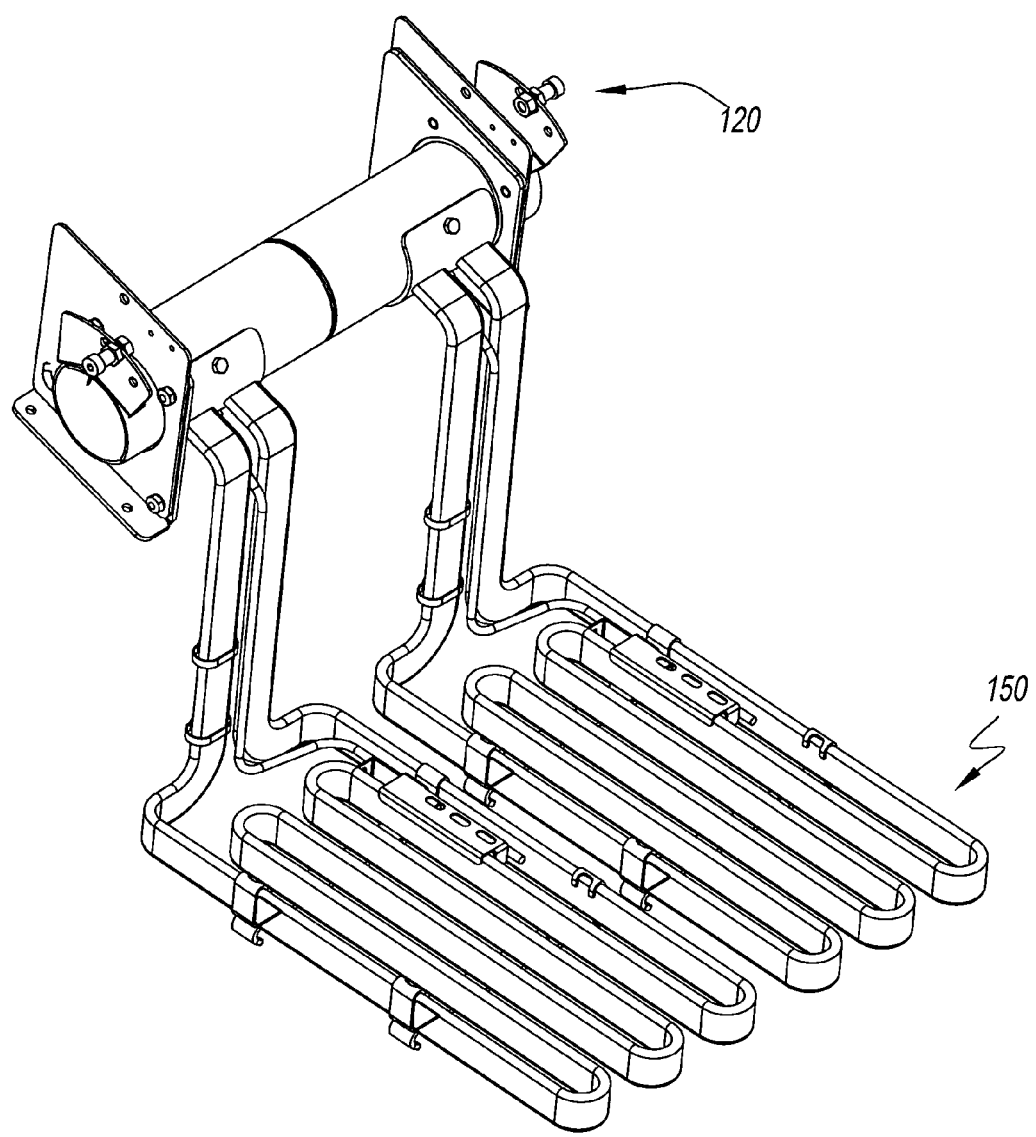
FIG. 15 shows a front, left side perspective view of an alternative embodiment of the pivot and heating element assemblies of the present disclosure.
Figure 16:
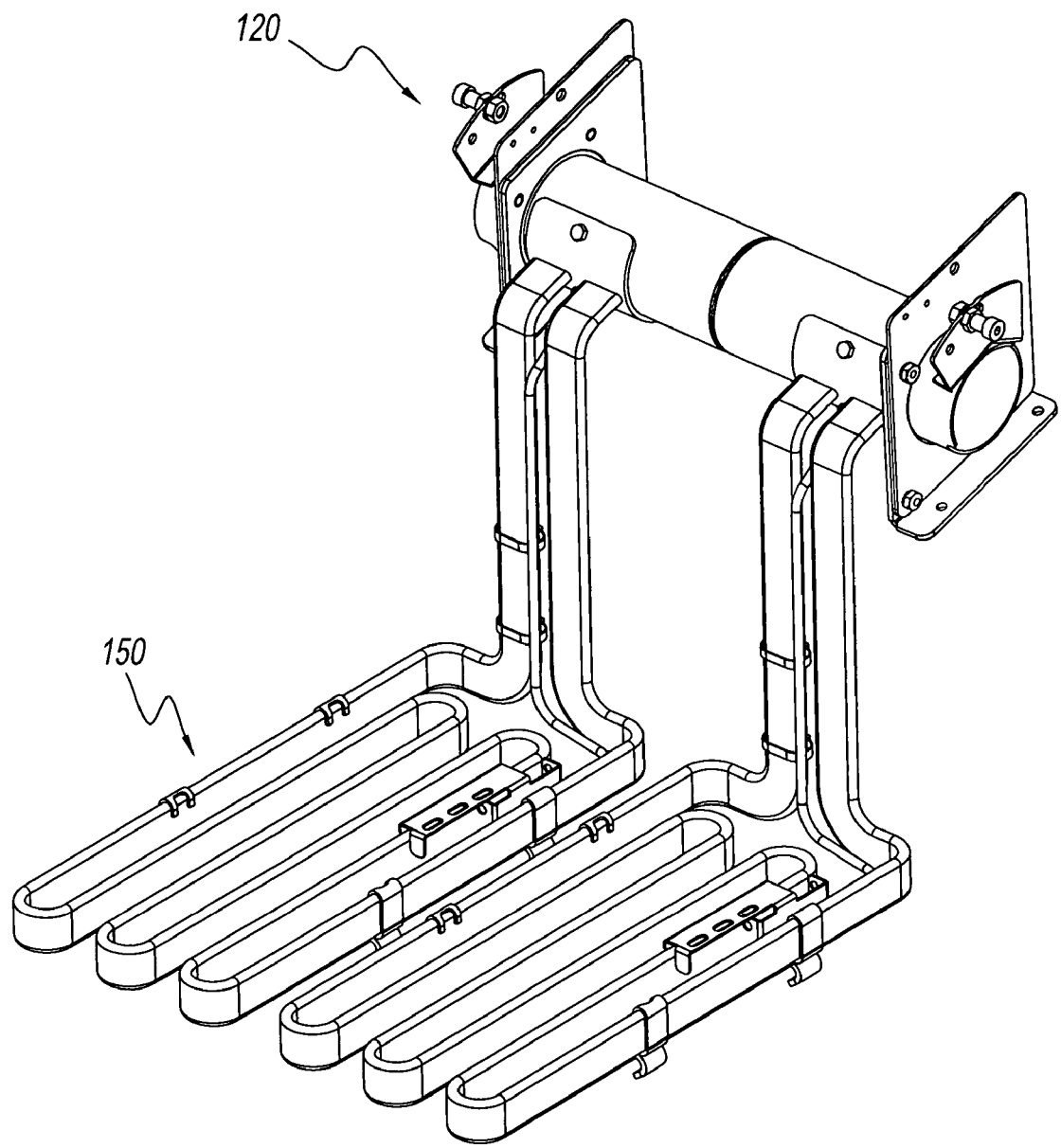
FIG. 16 shows a front, right side perspective view of the pivot and heating element assemblies of FIG. 15.

FIGS. 15 and 16 show an alternative embodiment of the present invention. Most of the components of the alternative embodiment function in the same way as the main embodiment of FIGS. 1 through 10, with the exceptions discussed below. The alternative embodiment has pivot assembly 120 and heating element assembly 150.

Figure 17:
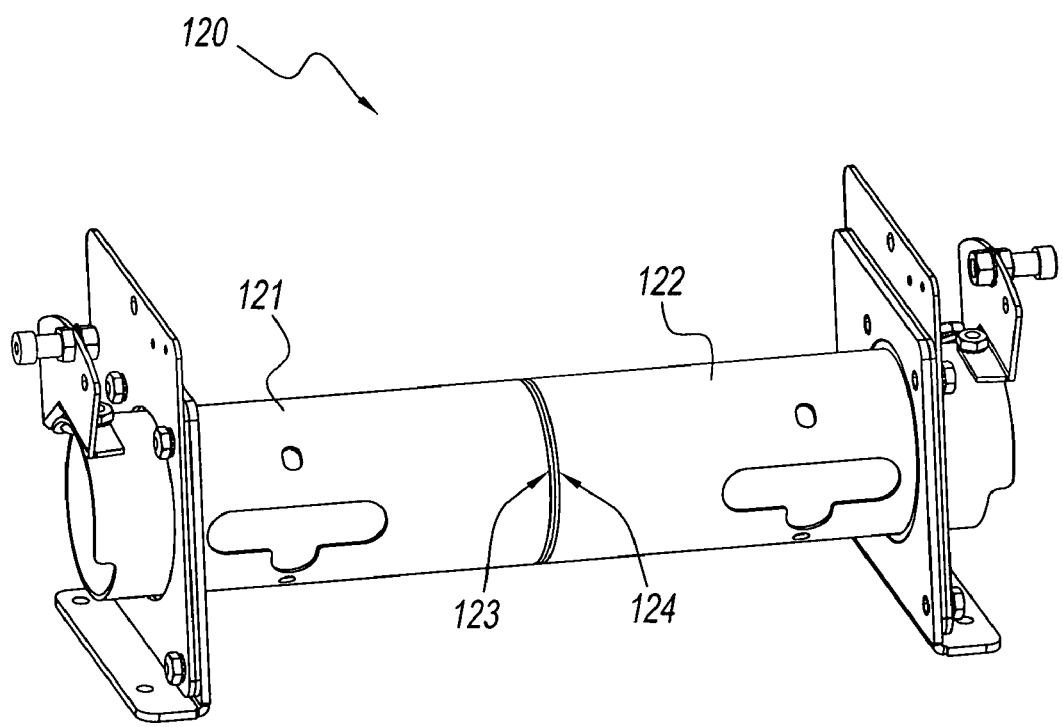
FIG. 17 shows a front, left side perspective view of an alternative embodiment of the pivot tube assembly of the present disclosure.
Figure 18:
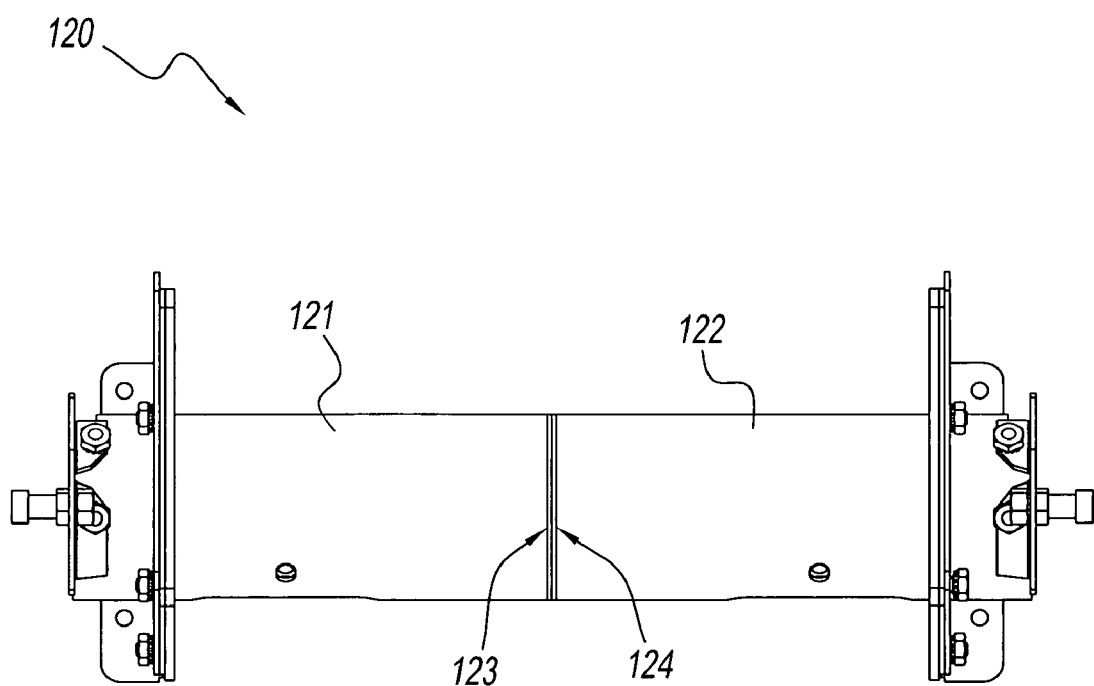
FIGS. 18, 19, and 20 show a top, front, and side view, respectively, of the pivot tube assembly respectively of FIG. 17.
Figure 19:
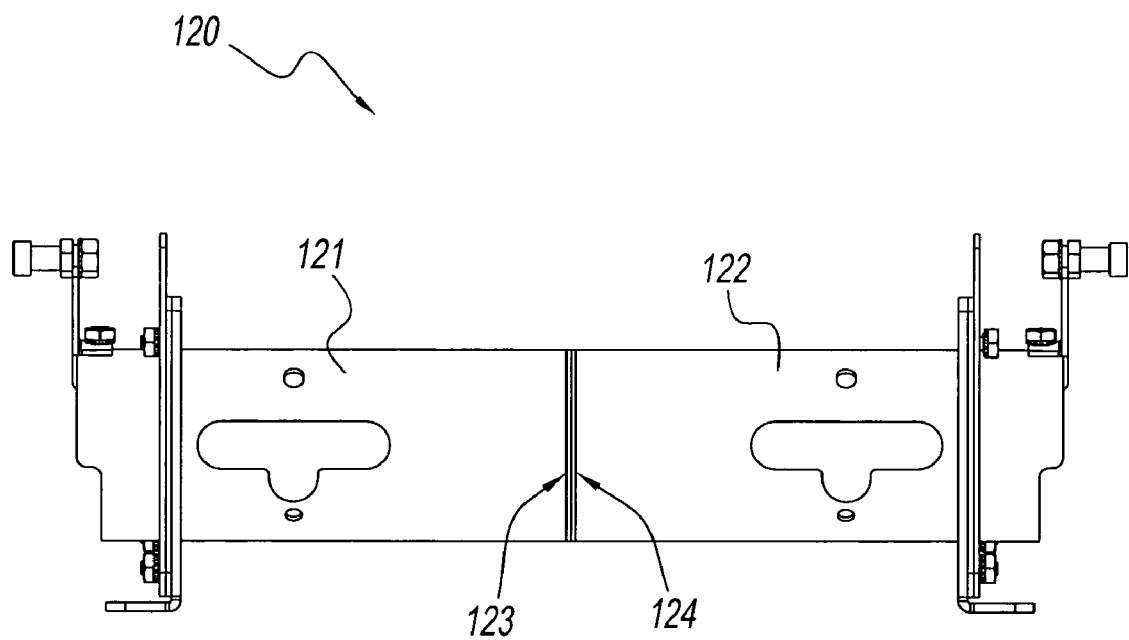

Referring to FIG. 17, 18, and 19, tube element 120 has left tube component 121 and right tube component 122. Separating the two components are left bushing 123 and right bushing 124. Thus, left and right tube components 121 and 122 can move independently of each other. The two bushings are made of Teflon to prevent leakage of cooking oil into the internal tube mechanism, and to reduce the friction between the two tube components. In the shown embodiment, left and right bushings 123 and 124 are made of Teflon; however, any heat resistant polymer with a low-friction coefficient can also be used.

Figure 20:
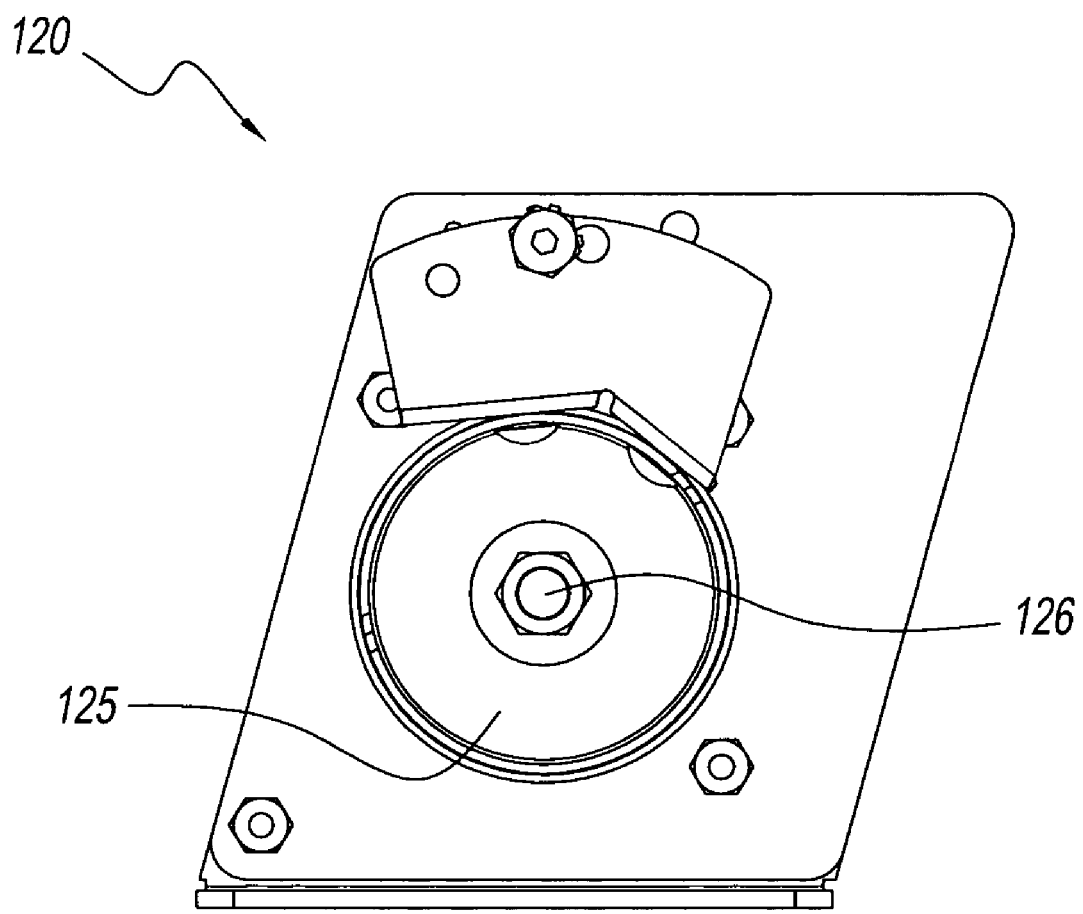

Referring to FIG. 20, tube insert 125 supports left and right tube components 121 and 122 when they are rotating. Tube insert 125 comprises two cylindrical components placed adjacent to one another inside left and right tube components 121 and 122, such that the seam between the two insert components aligns with the seam between left and right bushings 123 and 124. Insert fastener 126 is used to hold the insert components together, and can be adjusted to create the appropriate amount of friction between the insert components and tube components 121 and 122. In the shown embodiment, insert fastener 126 consists of a shoulder bolt, nut, and washer, though other means for controlling the friction between the insert components are contemplated by the present invention.

Figure 21:
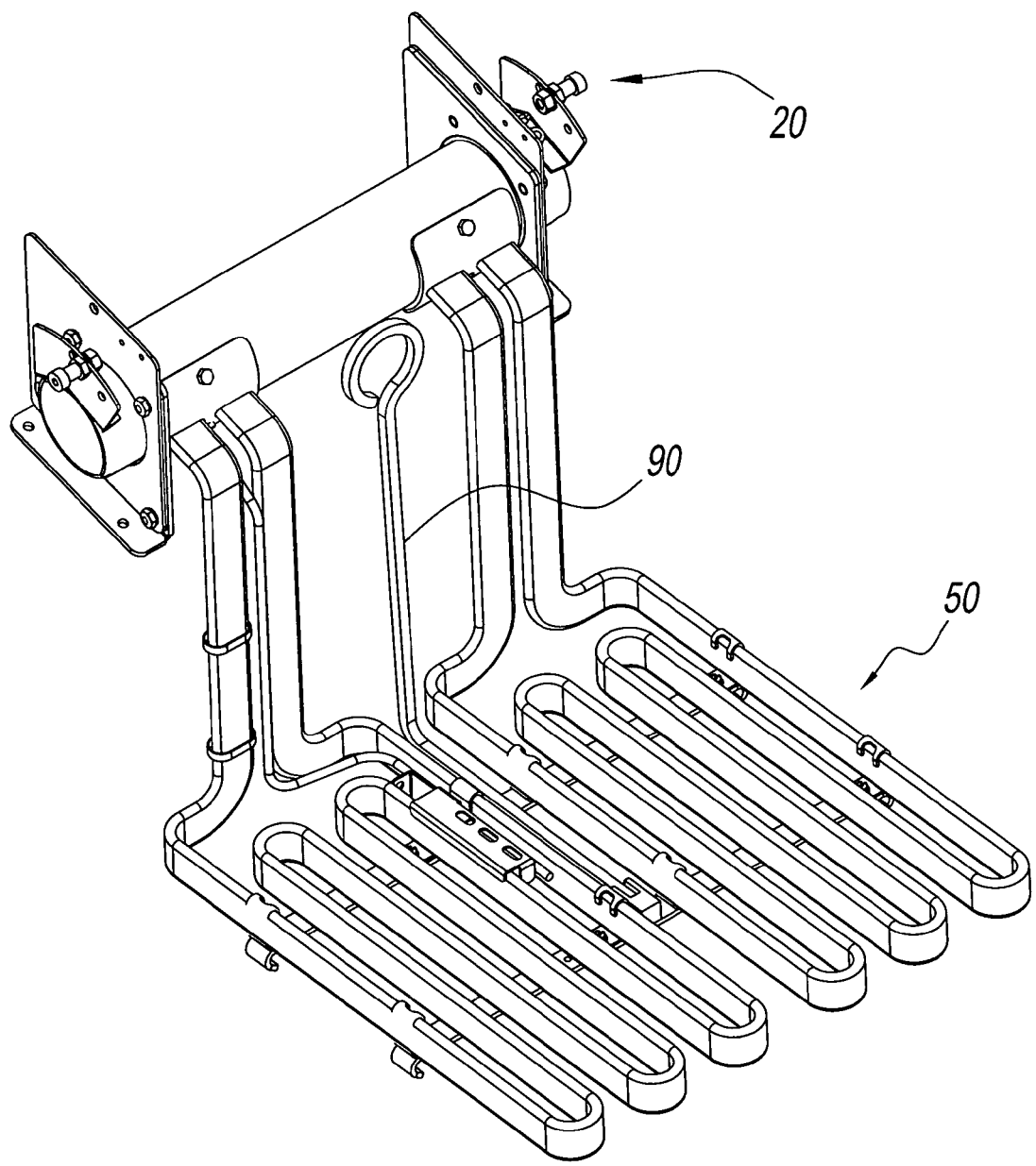
FIGS. 21 and 22 show the pivot and heating assemblies of FIGS. 1 and 2, respectively, with a lift handle.
Figure 22:
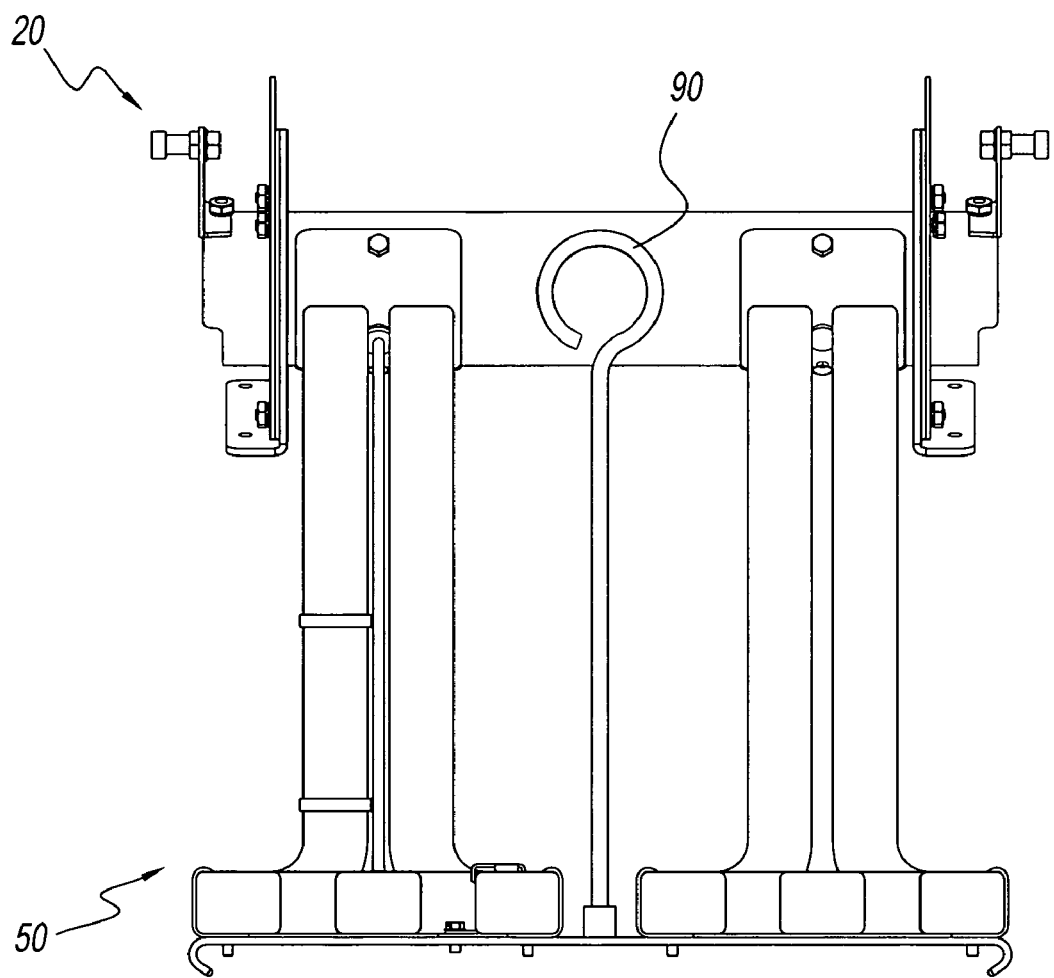
Figure 23:
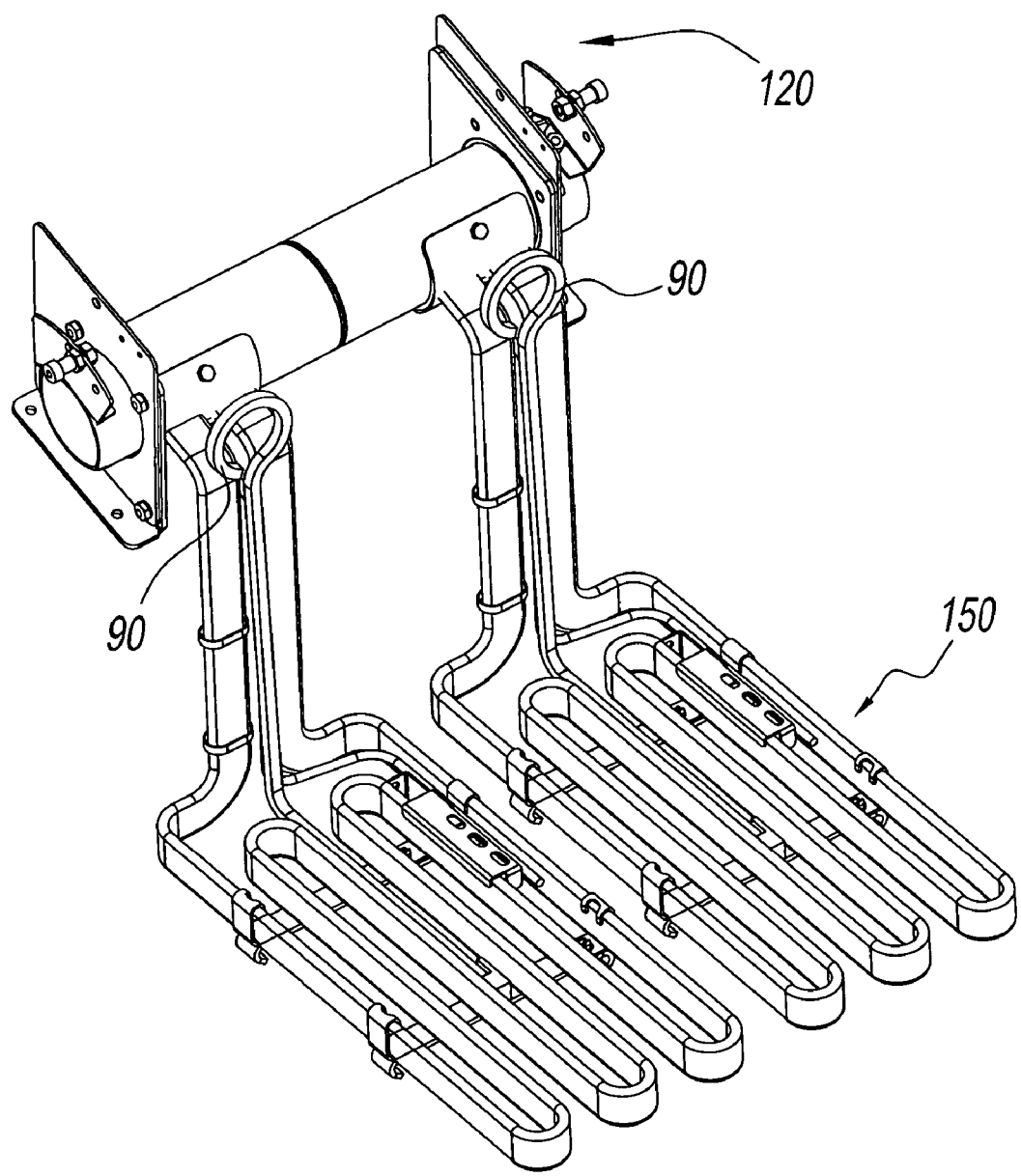
FIGS. 23 and 24 show the pivot and heating assemblies of FIGS. 15 and 16, respectively, with a lift handle.
Figure 24:
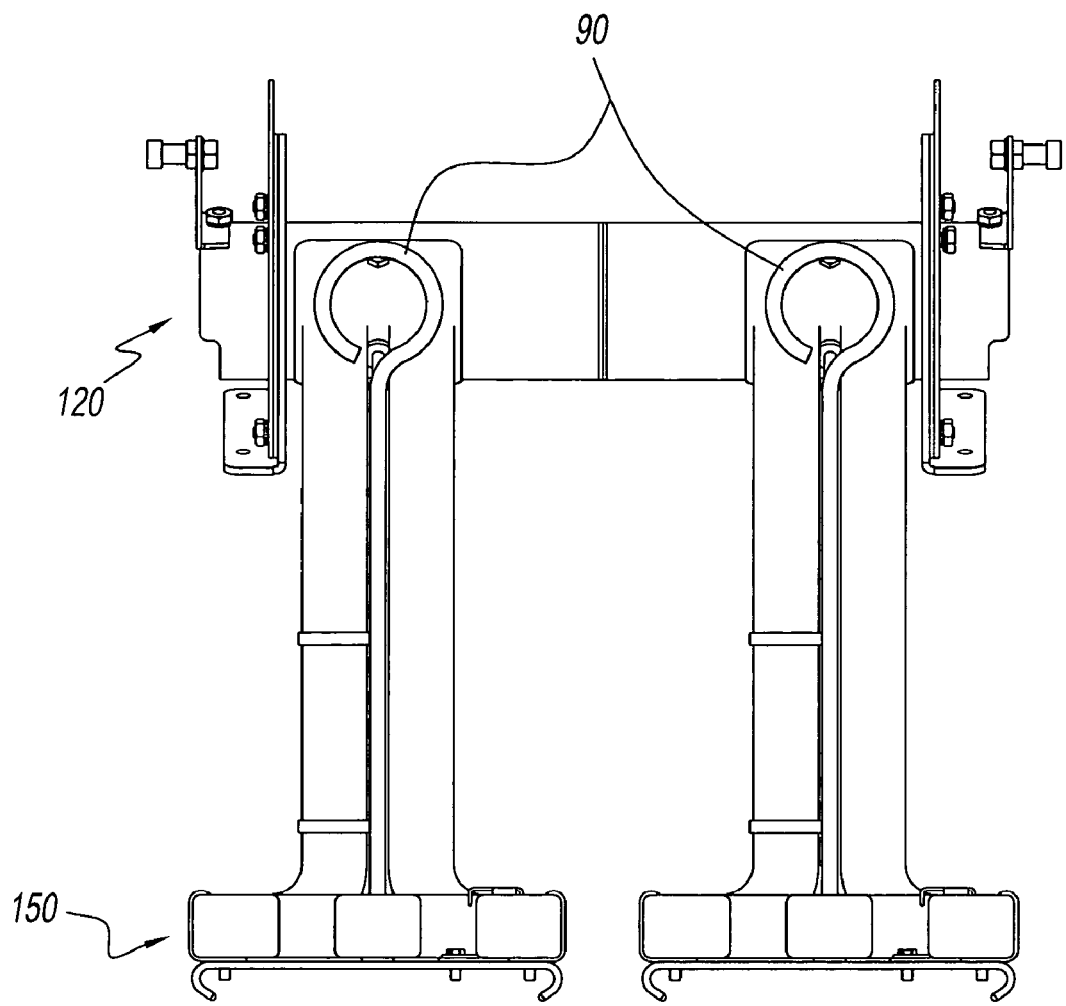

Referring to FIG. 21 through 24, an optional lift handle 90 for use in the pivot and heating element assemblies is shown. Lift handle 90 can be used with single tube pivot assembly 20 and heating element assembly 50, as shown in FIGS. 21 and 22, or with double tube pivot assembly 120 and heating element assembly 150, as is shown in FIGS. 23 and 24. When used with dual pivot assembly 120, there can be two lift handles 90. Lift handle 90 is affixed to the heating element assembly 50 or 150, so that a user can use lift handle 90 to manually lift the heating elements out of the frypot during use, if so desired.

The present invention having been thus described with particular reference to the preferred forms thereof, it will be obvious that various changes and modifications may be made therein without departing from the spirit and scope of the present invention as defined in the appended claims.

What is claimed is:

1. A pivot assembly, comprising:
   a pivot tube,
   at least one heating element, wherein said heating element is operably connected to said pivot tube;
   a pivot housing, wherein said pivot housing forms a seal with said pivot tube that prevents the passage of fluid therethrough, and
   wherein said pivot tube rotates about its linear axis to raise and lower said heating element.

2. The pivot assembly of claim 1, wherein said pivot tube further comprises a pair of brackets disposed at opposite end of said pivot tube and at least one spring operably connected to said brackets.

3. The pivot assembly of claim 2, wherein said spring is a tension spring.

4. The pivot assembly of claim 1, wherein said heating element is affixed to mounting brackets, wherein said mounting brackets are affixed to the pivot tube.

5. The pivot assembly of claim 1, further comprising a temperature probe operably connected to said heating element.

6. The pivot assembly of claim 1, wherein said pivot housing comprises an upper housing component and a lower housing component, wherein said upper and lower housing components are connected to each other so as to prevent the leakage of fluid therethrough.

7. The pivot assembly of claim 1, comprising a plurality of said heating elements, wherein said heating elements can be raised and lowered independently of one another.

8. A fryer assembly, comprising:
   a frypot;
   a pivot tube;
   at least one heating element, wherein said heating element is operably connected to said pivot tube; and
   a pivot housing, wherein said pivot housing forms a seal with said pivot tube that prevents the passage of fluid therethrough,
   wherein said pivot tube rotates about its linear axis to raise and lower said heating element.

9. The fryer assembly of claim 8, wherein said pivot tube further comprises a pair of brackets disposed at opposite ends of said pivot tube and at least one spring operably connected to said brackets.

10. The fryer assembly of claim 9, wherein said spring is a tension spring.

11. The fryer assembly of claim 8, wherein said heating element is affixed to mounting brackets, wherein said mounting brackets are affixed to the pivot tube.

12. The fryer assembly of claim 8, further comprising a temperature probe operably connected to said heating element.

13. The fryer assembly of claim 8, wherein said pivot housing comprises an upper housing component and a lower housing component, wherein said upper and lower housing components are connected to each other so as to prevent the leakage of fluid therethrough.

14. The fryer assembly of claim 8, comprising a plurality of said heating elements, wherein said heating elements can be raised and lowered independently of one another.

15. A method for cleaning a fryer assembly, wherein said fryer assembly comprises:
   a frypot,
   a pivot tube,
   at least one heating element, wherein said heating element is operably connected to said pivot tube;
   a pivot housing, wherein said pivot housing forms a seal with said pivot tube that prevents the passage of fluid therethrough,
   said method comprising the steps of:
   pivoting said heating element out of said frypot;
   removing waste material from said frypot; and
   pivoting said heating element back into said frypot.

16. The method of claim 15, wherein said fryer assembly comprises a plurality of said heating elements, and said heating elements can be pivoted independently of each other.

17. The pivot assembly of claim 2, further comprising two bushings, wherein each of said bushings forms a seal between said pivot tube and each of said pair of brackets.

18. The fryer assembly of claim 9, further comprising two bushings, wherein each of said bushings forms a seal between said pivot tube and each of said pair of brackets.

* * * * *